United States Patent
Trostle et al.

(10) Patent No.: US 9,815,340 B2
(45) Date of Patent: Nov. 14, 2017

(54) TIRE INFLATION SYSTEM AND METHOD OF CONTROL

(71) Applicant: ArvinMeritor Technology, LLC, Troy, MI (US)

(72) Inventors: Robert W. Trostle, Royal Oak, MI (US); Jonathan Honig, Bloomfield Hills, MI (US); John Ustick, Bloomfield Hills, MI (US); Stephen Rumple, Birmingham, MI (US); Jonathan Stauffer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 75 days.

(21) Appl. No.: 15/054,373

(22) Filed: Feb. 26, 2016

(65) Prior Publication Data

US 2016/0318354 A1    Nov. 3, 2016

Related U.S. Application Data

(60) Provisional application No. 62/155,168, filed on Apr. 30, 2015.

(51) Int. Cl.
*B60C 23/00* (2006.01)

(52) U.S. Cl.
CPC .................. *B60C 23/003* (2013.01)

(58) Field of Classification Search
CPC ..... B60C 23/00; B60C 23/003; B60C 23/007; B60C 23/10
See application file for complete search history.

(56) References Cited

U.S. PATENT DOCUMENTS

| | | | |
|---|---|---|---|
| 1,618,953 A | 2/1927 | Penn | |
| 2,663,310 A | 12/1953 | Heckman et al. | |
| 4,236,622 A | 12/1980 | Stevenson | |
| 4,441,539 A | 4/1984 | Hulse | |
| 4,640,331 A * | 2/1987 | Braun | B60C 23/003 |
| | | | 137/224 |
| 5,180,456 A | 1/1993 | Schultz et al. | |
| 5,309,969 A * | 5/1994 | Mittal | B60C 23/003 |
| | | | 137/224.5 |
| 5,413,159 A * | 5/1995 | Olney | B60C 23/004 |
| | | | 152/418 |
| 6,561,017 B1 * | 5/2003 | Claussen | B60C 23/0408 |
| | | | 73/146 |
| 6,666,078 B1 | 12/2003 | Claussen et al. | |
| 6,868,719 B1 | 3/2005 | Claussen et al. | |
| 6,994,136 B2 | 2/2006 | Stanczak | |
| 7,430,900 B2 | 10/2008 | Belanger | |
| RE41,756 E | 9/2010 | Claussen et al. | |

(Continued)

OTHER PUBLICATIONS

Arvinmeritor, Meritor Tire Inflation System (MTIS) by PSI (Trademark) including Meritor ThermALERT Trademark, PB-9999, Revised May 2007.

*Primary Examiner* — Kip T Kotter
(74) *Attorney, Agent, or Firm* — Brooks Kushman P.C.

(57) ABSTRACT

A system and method of controlling pressure of a tire. The method may include executing a low supply pressure operating mode when an available supply pressure of pressurized gas is less than a target tire pressure. The tire may be inflated with pressurized gas provided at the available supply pressure when an estimated tire pressure is not within a threshold amount of the available supply pressure.

20 Claims, 3 Drawing Sheets

(56) References Cited

U.S. PATENT DOCUMENTS

| | | |
|---|---|---|
| 7,931,061 B2 | 4/2011 | Gonska et al. |
| 2004/0055291 A1 | 3/2004 | Meydieu et al. |
| 2004/0173296 A1* | 9/2004 | White .................... B60C 23/003 152/417 |
| 2005/0194080 A1* | 9/2005 | White .................... B60C 23/003 152/417 |
| 2012/0186714 A1 | 7/2012 | Richardson |
| 2012/0234447 A1 | 9/2012 | Narloch et al. |
| 2015/0075672 A1* | 3/2015 | Trostle .................. B60C 23/003 141/4 |
| 2015/0375577 A1* | 12/2015 | Serbu ...................... B60C 23/10 152/418 |

* cited by examiner

TIRE INFLATION SYSTEM AND METHOD OF CONTROL

CROSS-REFERENCE TO RELATED APPLICATIONS

This application claims the benefit of U.S. provisional application Ser. No. 62/155,168 filed Apr. 30, 2015, the disclosure of which is hereby incorporated in its entirety by reference herein.

TECHNICAL FIELD

This disclosure relates to a tire inflation system and a method of control that includes a low supply pressure operating mode.

BACKGROUND

A tire pressure monitoring method is disclosed in U.S. Reissue Pat. No. RE41,756.

SUMMARY

In at least one embodiment, a method of controlling pressure of a tire is provided. The method may include executing a low supply pressure operating mode when an available supply pressure of pressurized gas is less than a target tire pressure. The low supply pressure operating mode may include providing a pulse of pressurized gas at the available supply pressure to a tire valve. An estimated tire pressure may be determined based on the pulse of pressurized gas. The tire may be inflated with pressurized gas provided at the available supply pressure when the estimated tire pressure is not within a threshold amount of the available supply pressure.

In at least one embodiment, a tire inflation system is provided. The tire inflation system may include a pressurized gas source, an outlet valve, an inlet valve, a pressure sensor, and an electronic control system. The pressurized gas source may provide pressurized gas at an available supply pressure. The outlet valve may control flow of the pressurized gas to a tire. The inlet valve may control flow of the pressurized gas to the outlet valve. The pressure sensor may be disposed between the inlet valve and the outlet valve. The electronic control system may execute a low supply pressure operating mode when the available supply pressure is less than a target tire pressure. A pulse of pressurized gas may be provided from the pressurized gas source to a tire valve by opening the inlet valve and the outlet valve. The inlet valve may be closed after a pressurized gas pulse duration time has elapsed. A predetermined period of time may be allowed to the lapse to allow pressure to stabilize between the inlet valve and the tire. An estimated tire pressure may be determined with the pressure sensor based on the pulse of pressurized gas. The tire may be inflated with pressurized gas that is provided at the available supply pressure when the estimated tire pressure is not within a threshold amount of the available supply pressure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
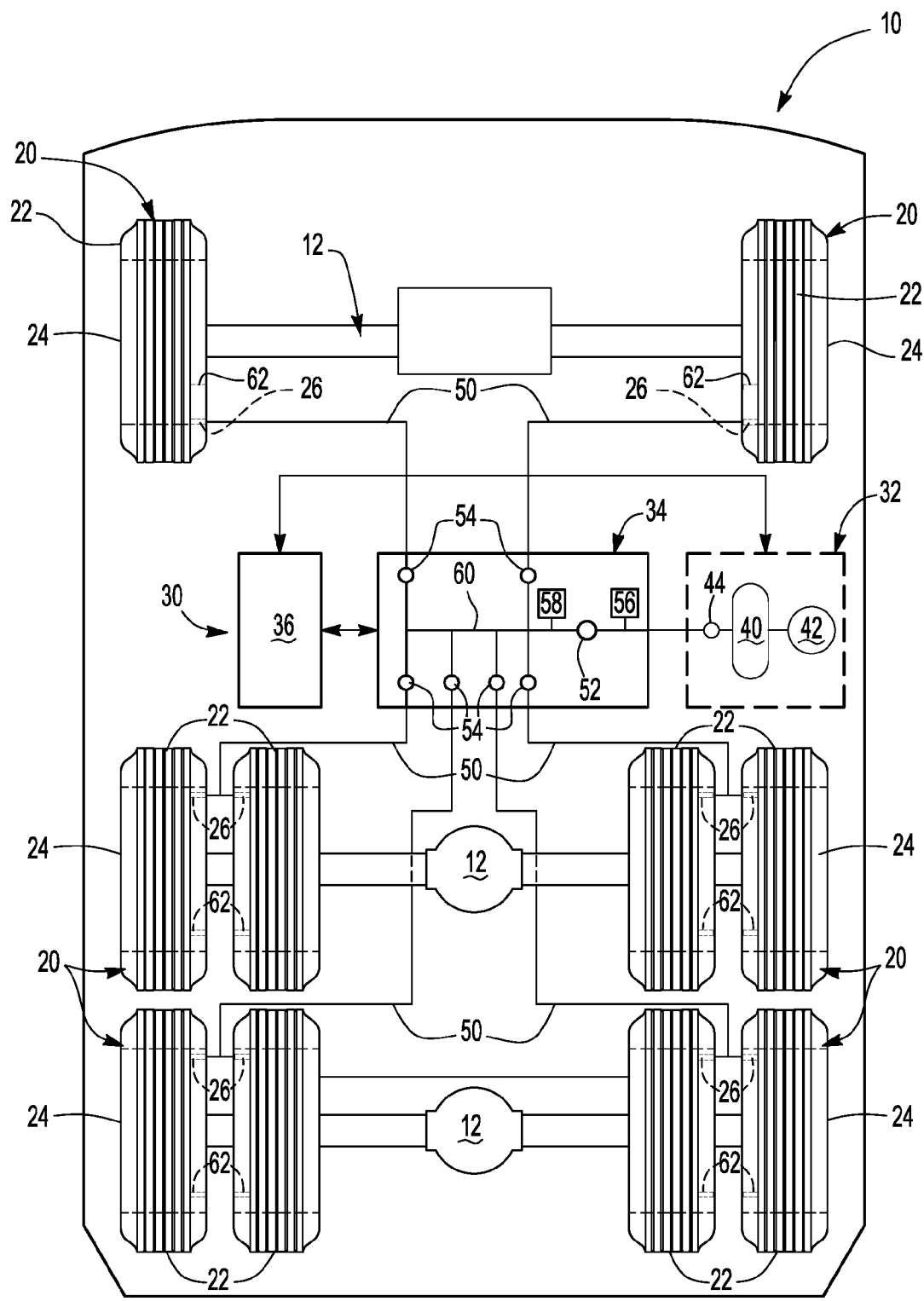
FIG. 1 is a schematic of an exemplary vehicle having a tire inflation system.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels.

The vehicle 10 may include a plurality of axles or axle assemblies 12 that may each support and facilitate rotation of at least one wheel assembly 20. An axle assembly 12 may or may not be configured as a drive axle that may provide torque to at least one associated wheel assembly. In addition, an axle assembly 12 may or may not be configured to steer the vehicle 10. Moreover, a steerable axle assembly 12 may be configured as a steering knuckle assembly or may include a steering knuckle assembly.

Each wheel assembly 20 may include at least one inflatable tire 22 that may be mounted on an associated wheel 24. Each tire 22 may have a tire valve 26 that may facilitate inflation or deflation of the tire 22. A tire valve 26 may extend through a hole in an associated wheel 24 and may be configured to provide gas to or exhaust gas from a chamber that may be disposed between or may be at least partially defined by the tire 22 and the wheel 24. Each tire valve 26 may be normally closed to inhibit pressurized gas from exiting the tire 22 through the tire valve 26. The tire valve 26 may open when pressurized gas is supplied to the tire valve 26 under sufficient pressure, such as a pressure that is greater than the tire pressure or the pressure inside the tire 22. In FIG. 1, the tire valve locations are generalized for illustration purposes and are not intended to be limiting.

The vehicle 10 may also include a tire inflation system 30 that may monitor or determine tire pressure and that may inflate or inflate and deflate one or more tires 22. For instance, the tire inflation system 30 may be configured to provide a pressurized gas or pressurized gas mixture to one or more tires 22 via a corresponding tire valve 26. For clarity, the term "pressurized gas" is used to generically refer to either a pressurized gas or a pressurized gas mixture in this disclosure. For instance, a pressurized gas may include a purified gas that may include substantially one element, such as nitrogen. A pressurized gas mixture may include a mixture of gases having different elements, such as is found in air. The tire inflation system 30 may include a pressurized gas source 32, a gas supply subsystem 34, and a control system 36.

The pressurized gas source 32 may supply pressurized gas to the tire inflation system 30 and other vehicle systems, such as an air brake system or an axle suspension system. The pressurized gas source 32 may include a reservoir or tank 40 and a pump or compressor 42. The compressor 42 may be driven by a vehicle engine or vehicle power source and may be fluidly connected to the tank 40. The tank 40 may disposed downstream from the compressor 42 and may store pressurized gas that is received from the compressor 42. A pressure protection valve 44 may be disposed between the tank 40 and the tire inflation system 30 and between the tank 40 and other vehicle systems that may be fluidly connected to the pressurized gas source 32. The pressure protection valve 44 may be configured as a check valve that may be normally closed when the pressurized gas source 32 does not provide pressurized gas to the tire inflation system 30 or another vehicle system.

The gas supply subsystem 34 may fluidly connect the pressurized gas source 32 to one or more tires 22. The gas supply subsystem 34 may include one or more conduits 50, such as a hose, tubing, pipe, or combinations thereof, which may provide pressurized gas to at least one tire 22 via a corresponding tire valve 26. The conduit configuration in FIG. 1 is merely exemplary. For instance, a single conduit 50 may be associated with each tire 22 rather than multiple tires as is shown in the bottom half of FIG. 1. In at least one configuration, the gas supply subsystem 34 may include an inlet valve 52, at least one outlet valve 54, a first pressure sensor 56, and a second pressure sensor 58.

The inlet valve 52 may enable or disable the flow of pressurized gas from an outlet of the pressurized gas source 32 to at least one outlet valve 54. Operation of the inlet valve 52 may be controlled by the control system 36. For instance, the inlet valve 52 may include or may be controlled by an actuator, such as solenoid, that may actuate the inlet valve 52 between an open position and a closed position. In the open position, pressurized gas may flow from the pressurized gas source 32 to a manifold 60. The manifold 60 may distribute pressurized gas to multiple conduits 50 and may be disposed between the inlet valve 52 and one or more outlet valves 54. In the closed position, pressurized gas may be inhibited from flowing from the pressurized gas source 32 to the manifold 60. In at least one embodiment, the inlet valve 52 may be normally closed under predetermined operating conditions, such as when the vehicle 10 is not operational or turned off or when the vehicle engine is not running. As such, the inlet valve 52 may inhibit depressurization of the pressurized gas source 32 in the event of a downstream leak.

The outlet valve 54 may enable or disable the flow of pressurized gas from the manifold 60 to a tire 22 or tire valve 26. In FIG. 1, six outlet valves 54 are shown, although it is contemplated that a greater or lesser number of outlet valves 54 may be provided. Each outlet valve 54 may be associated with a different tire 22 and a different conduit 50. Moreover, each outlet valve 54 may be actuated independently of the inlet valve 52 and independently of each other. As such, the inflation and pressure assessment of different tires 22 or sets of tires 22 may be independently controlled.

Operation of the outlet valve 54 may be controlled by the control system 36. For instance, the outlet valve 54 may include or may be controlled by an actuator, such as solenoid, that may actuate the outlet valve 54 between an open position and a closed position. In the open position, pressurized gas may flow from the manifold 60 to at least one corresponding tire valve 26. In the closed position, pressurized gas may be inhibited from flowing from the manifold 60 to at least one corresponding tire valve 26. As such, pressurized gas may not be constantly provided to one or more tires 22, which may facilitate the use of pressure pulses to estimate tire pressure as will be discussed in more detail below. In addition, the outlet valve 54 may allow a conduit 50 to be vented to the surrounding environment between the outlet valve 54 and a corresponding tire valve 26. In at least one embodiment, the outlet valve 54 may be normally closed under predetermined operating conditions, such as when the vehicle 10 is not operational or turned off or when the vehicle engine is not running.

The first pressure sensor 56 may be configured to detect the pressure of the pressurized gas provided by the pressurized gas source 32 (e.g., available supply pressure) or provide a signal indicative of the pressure of pressurized gas provided by the pressurized gas source 32. The first pressure sensor 56, which may also be referred to as a supply pressure sensor, may be of any suitable type and may be fluidly connected to the pressurized gas source 32. For example, the first pressure sensor 56 may be fluidly connected to the pressurized gas source 32 between the pressurized gas source 32 and the inlet valve 52.

The second pressure sensor 58 may be configured to detect the pressure of the pressurized gas provided to a tire 22 or tire valve 26 or provide a signal indicative of the pressure of the pressurized gas provided to a tire 22 or tire valve 26. The second pressure sensor 58, which may also be referred to as a manifold pressure sensor, may be of any suitable type and may be disposed between the inlet valve 52 and the tire valve 26 and may be fluidly connected to the manifold 60. As such, the second pressure sensor 58 may be isolated from the pressurized gas source 32 by closing the inlet valve 52. In at least one embodiment, the second pressure sensor 58 may be disposed between the inlet valve 52 and one or more outlet valves 54 so that the second pressure sensor 58 may be used to detect the pressure of pressurized gas supplied to different tires or estimate tire pressure as will be discussed in more detail below. Alternatively, multiple second pressure sensors 58 may be provided that may detect or provide a signal indicative of the pressure in a particular conduit 50 or particular tire 22.

Optionally, a tire pressure sensor 62 may be disposed inside the tire 22 or inside a tire chamber that receives the pressurized gas. Such a tire pressure sensor 62 may provide a signal or data that is indicative of the tire pressure or inflation pressure of the tire to the control system 36. The tire pressure sensor 62 may wirelessly communicate with the control system 36 in one or more embodiments.

The control system 36 may monitor and control operation of the tire inflation system 30. The control system 36 may be a microprocessor-based control system that may include one or more electronic controllers or control modules that may monitor and/or control various components of the tire inflation system 30. For example, the control system 36 may be configured to control operation of the compressor 42 and control actuation of the inlet valve 52 and the outlet valve 54 to control the flow of pressurized gas. In addition, the control system 36 may be configured to receive data from the first pressure sensor 56 and the second pressure sensor 58 that may be indicative of pressure. In FIG. 1, communication between the control system 36 and these components is represented by the double arrowed lines located adjacent to the control system 36.

Figure 2:
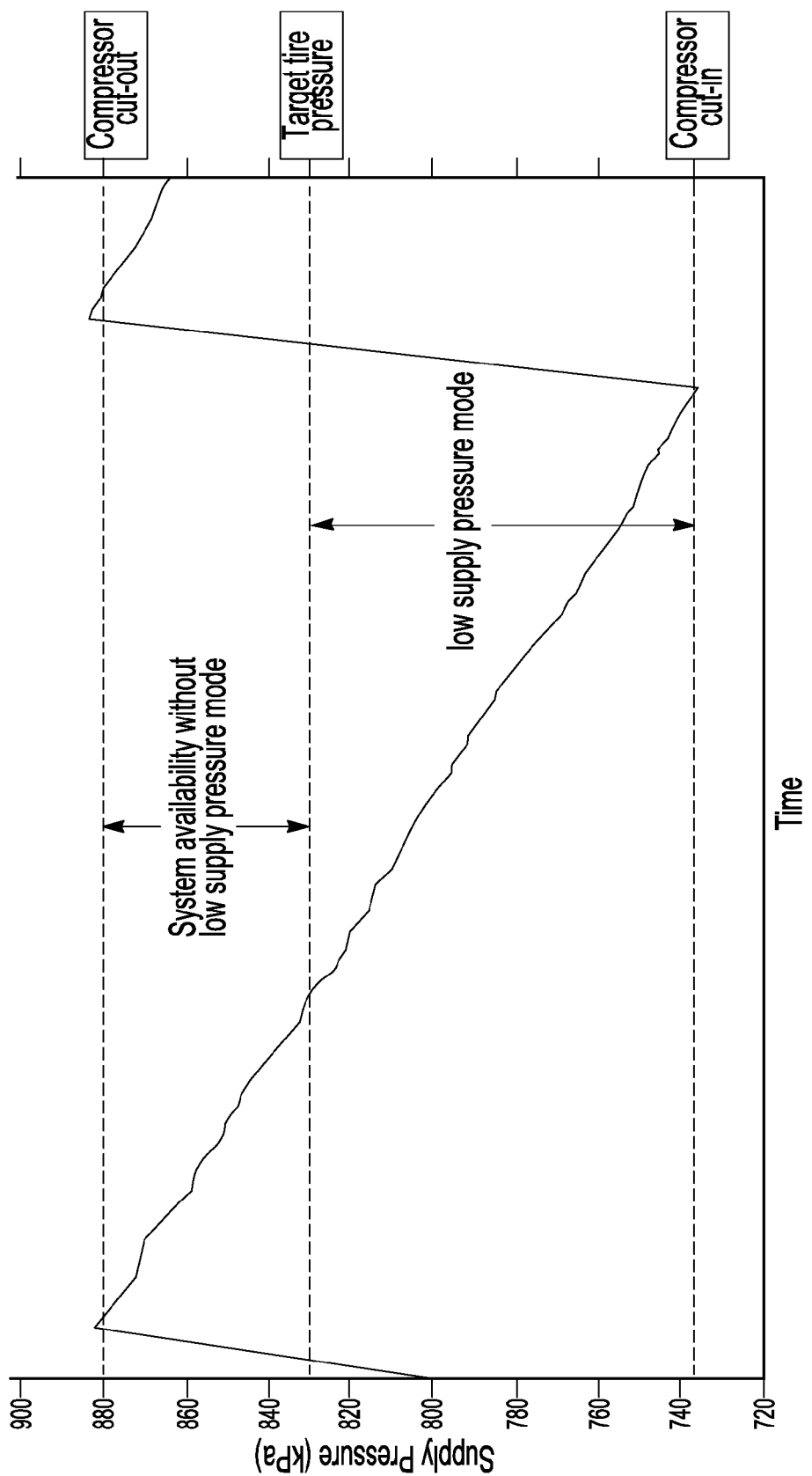
FIG. 2 is an exemplary plot that helps illustrate operation of the tire inflation system.

Referring to FIG. 2, an example of how the available supply pressure of pressurized gas provided by the pressurized gas source 32 may change over time is shown. The available supply pressure may be the pressure of pressurized gas that the pressurized gas source 32 may output at a particular time and is represented by the solid zigzag line. For instance, the available supply pressure may be the pressure of pressurized gas that may be available or may be currently supplied by the tank 40 to the tire inflation system 30. As such, the available supply pressure may vary over time and may be the maximum pressure of pressurized gas that may be provided to the tire inflation system 30 at a particular instance in time.

The available supply pressure may increase when the compressor 42 is operating. For example, the compressor 42 may be activated when the available supply pressure drops below a compressor cut-in pressure. In FIG. 2, an exemplary compressor cut-in pressure is represented by the horizontal dashed line at approximately 738 kPa. The compressor cut-in pressure may be less than a target tire pressure or desired inflation pressure of a tire. In FIG. 2, an exemplary target tire pressure is represented by the horizontal dashed line at 830 kPa. The compressor 42 may provide pressurized gas to the tank 40 when the compressor is running. For instance, the compressor 42 may output pressurized gas at a substantially constant rate in one or more embodiments. Over time, the pressure in the tank 40, and hence the available supply pressure, may increase as more pressurized gas is received from the compressor 42 as indicated by the line segments that extend upward on the plot.

The available supply pressure may decrease when the compressor 42 is not operating and the pressurized gas source 32 is supplying or providing pressurized gas to one or more vehicle systems, such as the tire inflation system 30. The compressor 42 may be deactivated or turned off when the available supply pressure exceeds a compressor cut-out pressure. In FIG. 2, an exemplary compressor cut-out pressure is represented by the horizontal dashed line at approximately 880 kPa. The compressor cut-out pressure may be greater than a target tire pressure as will be discussed in more detail below.

After reaching the compressor cut-out pressure, the available supply pressure of pressurized gas provided by the tank 40 may decrease over time as the pressurized gas source 32 provides pressurized gas to the tire inflation system 30 and/or other vehicle systems since the compressor 42 is inactive. Thus, the available supply pressure may drop below the target tire pressure and eventually reach the compressor cut-in pressure, resulting in activation of the compressor as previously described.

Figure 3:
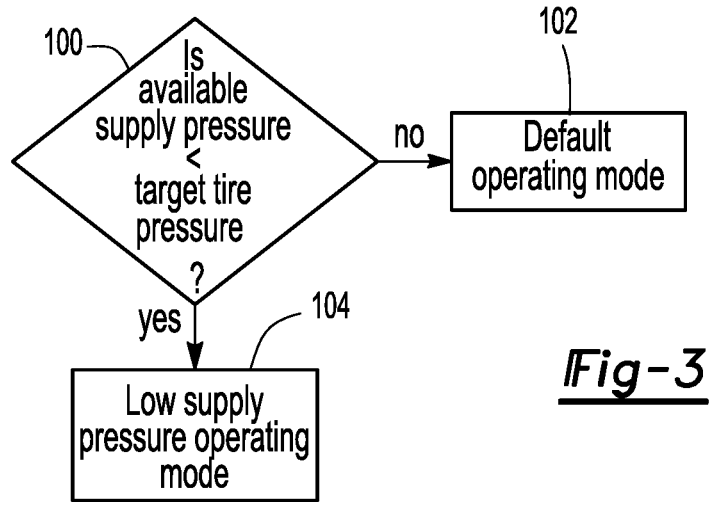
FIG. 3 is a flowchart of a method of control of the tire inflation system.

Referring to FIG. 3, a flowchart of an exemplary method of control of the tire inflation system 30 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 36 and may be implemented as a closed loop control system. Moreover, the method may be enabled or disabled based on the operating state of the vehicle 10. For example, the method or control logic may be enabled when the vehicle ignition is turned on, the engine is running, or when the vehicle is in motion in one or more embodiments. In addition, the method may be manually activated.

The method will be primarily described in the context of evaluating the pressure of a single tire, but it is to be understood that the method may be applied to estimate and/or adjust the pressure of multiple tires or sets of tires.

As an overview, the method may select an operating mode based on the available supply pressure and then operate by executing the selected operating mode.

At block 100, the method may determine whether the available supply pressure that can currently be provided by the pressurized gas source 32 is less than a target tire pressure. The available supply pressure may be based on data provided by the first pressure sensor 56. The target tire pressure may be a desired tire pressure that may be associated with one or more tires. For example, the target tire pressure may be a predetermined value and may account for design tolerances of the tire valve 26 or the tolerance range associated with the pressure at which the tire valve 26 opens. If the available supply pressure is not less than the target tire pressure, then the method or method subroutine may continue at block 102. If the available supply pressure is less than the target tire pressure, then the method may continue at block 104.

At block 102, a default operating mode may be executed. In the default operating mode, a tire can be inflated to the target tire pressure since the available supply pressure is greater than or equal to the target tire pressure. As such, the default operating mode will not inflate a tire to a tire pressure that is less than the target tire pressure presuming that there are no significant tire leaks or operating malfunctions associated with the tire inflation system 30. As an overview, a default operating mode may determine a pressure of a tire and may inflate the tire to the target tire pressure when the pressure of the tire is less than the target tire pressure.

At block 104, a low supply pressure operating mode may be executed. In the low supply pressure operating mode, a tire 22 can be inflated to the available supply pressure, but not to the target tire pressure since the available supply pressure is less than the target tire pressure. As such, the low supply pressure operating mode estimates or attempts to determine the inflation pressure of a tire 22 and then attempts to inflate the tire 22 to the available supply pressure if it is determined that the tire is underinflated with respect to the available supply pressure (e.g., that the estimated tire pressure is less than the available supply pressure).

It is noted that the operating mode may change in response to changes in the available supply pressure. For instance, the low supply pressure operating mode is not executed when the available supply pressure is increased above the target tire pressure by a compressor.

Figure 4:
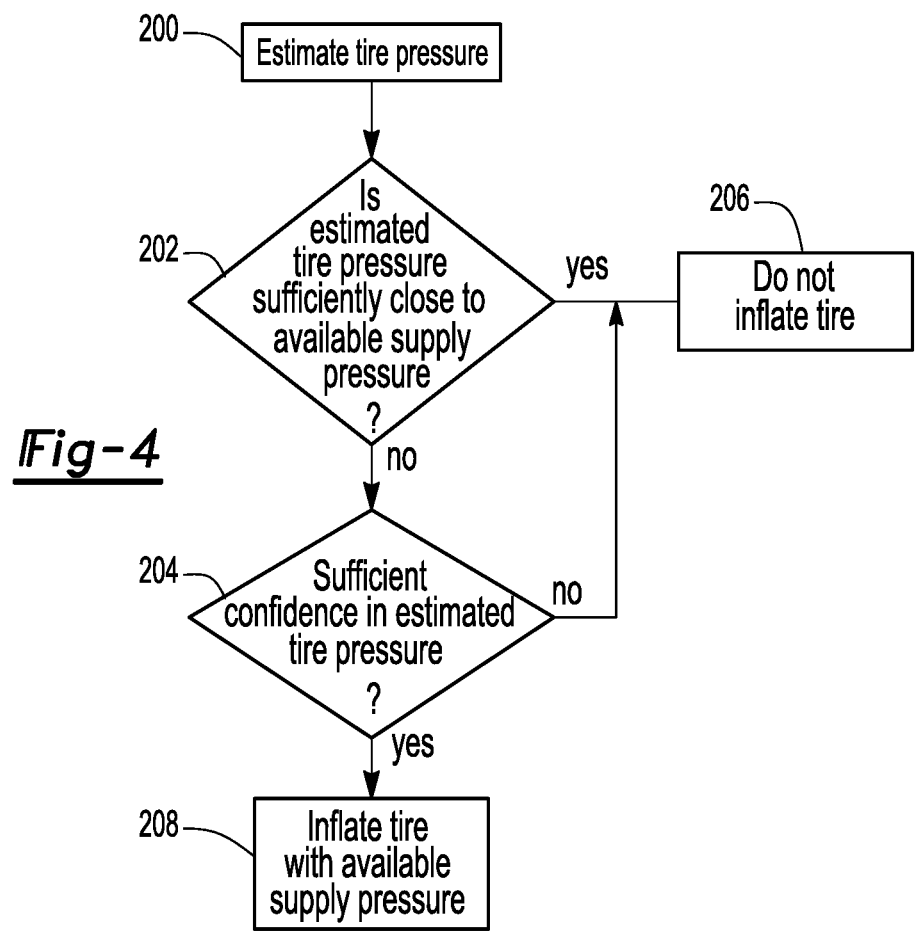
FIG. 4 is a flowchart of a low supply pressure operating mode that may be part of the method of control.

Referring to FIG. 4, the low supply pressure operating mode is shown in more detail.

At block 200, the pressure of one or more tires may be estimated. Tire pressure may be estimated in various ways depending on the configuration of the tire inflation system 30. For example, tire pressure may be estimated with a tire pressure sensor 62 that may be disposed inside the tire 22 or inside a tire chamber that receives the pressurized gas. Tire pressure may also be estimated with a pressure sensor that is disposed outside the tire 22. For example, tire pressure may be estimated by providing a pulse of pressurized gas to a tire 22 or tire valve 26 at the available supply pressure. More specifically, a pulse of pressurized gas may be delivered at the available supply pressure from the pressurized gas source 32 to a tire 22 or tire valve 26 by opening the outlet valve 54 associated with the tire 22, opening the inlet valve 52, and closing the inlet valve 52 after a pressurized gas pulse duration time has elapsed. The pressurized gas pulse duration time may be a predetermined value in one or more embodiments. Next, a predetermined period of time may be allowed to lapse after the inlet valve 52 is closed to allow pressure to stabilize between the inlet valve 52 and the tire 22. Finally, an estimated tire pressure may be determined using the second pressure sensor 58. If the tire pressure or pressure in the tire 22 is greater than the available supply pressure, then the tire valve 26 will not open and the pressure pulse will be isolated between the tire valve 26 and the inlet valve 52. Accordingly, the pressure detected by the second pressure sensor 58 will be substantially similar to the pressure associated with the pressurized gas pulse. If the tire pressure is less than the available supply pressure, then the tire valve 26 will open and some of the pressure pulse will enter the tire 22. Accordingly, the pressure detected by the second pressure sensor 58 will be less than the available supply pressure by detectable and operationally meaningful amount.

At block 202, the estimated tire pressure may be compared to the available supply pressure. More specifically, the method may determine whether the estimated tire pressure is sufficiently close to the available supply pressure. The estimated tire pressure may be sufficiently close to the available supply pressure when there is either no difference between the estimated tire pressure and the available supply pressure or when the difference between the target tire pressure and the estimated tire pressure is less than a threshold amount. The threshold amount may be a constant amount that may account for the design tolerances of the tire inflation system 30 and tire valve 26 (e.g., tolerance with respect to a nominal pressure at which the tire valve 26 is designed to open). As a non-limiting example, the threshold amount may be about 10 kPa. Thus in this non-limiting example, the estimated tire pressure may be sufficiently close to the available supply pressure when the estimated tire pressure detected by the second pressure sensor 58 is not more than 10 kPa less than the available system pressure. If the estimated tire pressure is not sufficiently close to the available supply pressure, then the method may continue at block 204. If the estimated tire pressure is sufficiently close to the available supply pressure (i.e., the estimated tire pressure is within the threshold amount of the available supply pressure or is greater than or equal to the available supply pressure), then the method may continue at block 206.

At block 204, the method may optionally determine or assess whether there is sufficient confidence in the estimated tire pressure. There may be sufficient confidence in the estimated tire pressure measurement or assessment when the estimated tire pressure is sufficiently stable or repeatable. As such, the steps associated with block 202 may be repeated one or more times to obtain additional estimated tire pressure readings. One or more estimated tire pressure readings may be compared to each other to determine whether the readings are sufficiently close to each other and hence sufficiently stable or repeatable. For instance, there may be sufficient confidence when the estimated tire pressure readings differ by less than a predetermined confidence amount. If there is not sufficient confidence on the estimated tire pressure, then the method may continue at block 206. If there is sufficient confidence on the estimated tire pressure, then the method may continue at block 208.

At block 206, the tire may not be inflated. The tire 22 may not be inflated because the tire pressure is estimated to be at least the available supply pressure. As such, the tire 22 is already inflated as much as possible given the available supply pressure. It is noted that in a system that does not have a tire pressure sensor 62 inside the tire 22, the actual tire pressure can only be estimated when the estimated tire pressure is sufficiently close to the available supply pressure. In other words, the tire may be overinflated (i.e., the actual tire pressure may be greater than the target tire pressure), properly inflated (i.e., the actual tire pressure may be equal to the target tire pressure), or underinflated (the actual tire pressure may be less than the target tire pressure but greater than or equal to the available supply pressure) when the estimated tire pressure is sufficiently close to the available supply pressure.

At block 208, the tire may be inflated with pressurized gas that may be provided at the available supply pressure. As such, the tire 22 may be inflated to a pressure that is less than the target tire pressure and does not exceed the available supply pressure. The tire 22 may be inflated by providing pressurized gas from the pressurized gas source 32 to the tire 22 by opening the inlet valve 52 and the outlet valve 54 associated with the tire 22. Pressurized gas may be provided continuously or intermittently to inflate the tire 22 to the available supply pressure. For instance, pressurized gas may be provided at the available supply pressure for a predetermined period of time, such as may be stored in and referenced from a lookup table. Alternatively, pressurized gas may be provided intermittently using multiple pulses of pressurized gas to increase the tire pressure to the available supply pressure.

Providing a tire inflation system with a low supply pressure operating mode may allow a tire inflation system to operate and increase the pressure of a tire when the available supply pressure is less than a target tire pressure. In a tire inflation system without a low supply pressure operating mode, the tire inflation system may not measure tire pressure or inflate a tire when the target tire pressure is greater than the available supply pressure. As such, the tire inflation system may not be functional when the available supply pressure is less than a target tire pressure (e.g., the tire inflation system may not estimate the tire pressure, inform an operator of a low tire pressure, or take action to attempt to increase tire pressure). As such, the tire inflation system may not inflate a tire in the absence of a low supply pressure operating mode until the supply pressure decreases to the compressor cut-in limit and the compressor is activated to increase the available supply pressure above the target tire pressure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling pressure of a tire comprising:
   determining whether an available supply pressure of pressurized gas is less than a target tire pressure; and
   executing a low supply pressure operating mode with an electronic control system when the available supply pressure is less than the target tire pressure, the low supply pressure operating mode including:
providing a pulse of pressurized gas at the available supply pressure to a tire valve;
determining an estimated tire pressure based on the pulse of pressurized gas; and
inflating the tire with pressurized gas provided at the available supply pressure when the estimated tire pressure is not within a threshold amount of the available supply pressure;
wherein the available supply pressure is determined before determining whether the estimated tire pressure is less than the target tire pressure.

2. The method of claim 1 wherein the tire is inflated to a pressure that does not exceed the available supply pressure.

3. The method of claim 1 wherein the tire is inflated to the available supply pressure.

4. The method of claim 1 further comprising not inflating the tire when the estimated tire pressure is within the threshold amount of the available supply pressure.

5. The method of claim 1 further comprising not inflating the tire when the estimated tire pressure is greater than or equal to the available supply pressure.

6. The method of claim 1 wherein the pulse of pressurized gas is delivered from a pressurized gas source to the tire by opening an inlet valve disposed between the pressurized gas source and the tire valve, and closing the inlet valve after a pressurized gas pulse duration time has elapsed.

7. The method of claim 6 wherein the estimated tire pressure is determined by waiting a predetermined period of time after the inlet valve is closed to allow pressure to stabilize between the inlet valve and the tire and measuring pressure with a pressure sensor.

8. The method of claim 7 wherein the pressure sensor is disposed between the inlet valve and the tire valve.

9. The method of claim 6 wherein the pulse of pressurized gas opens the tire valve when the tire pressure is less than the available supply pressure.

10. The method of claim 6 wherein the tire pressure is greater than or equal to the available supply pressure when the pulse of pressurized gas does not open the tire valve.

11. The method of claim 6 wherein the available supply pressure decreases until the available supply pressure provided by the pressurized gas source is less than a compressor cut-in pressure.

12. The method of claim 1 wherein the pulse of pressurized gas does not open the tire valve when the tire pressure exceeds the available supply pressure.

13. The method of claim 1 wherein the low supply pressure operating mode is not executed when the available supply pressure exceeds the target tire pressure.

14. The method of claim 1 wherein the tire is inflated with pressurized gas at the available supply pressure when the estimated tire pressure is less than the target tire pressure and the estimated tire pressure is not within the threshold amount of the available supply pressure.

15. The method of claim 1 wherein the low supply pressure operating mode is not executed when the available supply pressure is greater than the target tire pressure.

16. The method of claim 1 wherein the low supply pressure operating mode is not executed when the available supply pressure is increased above the target tire pressure by a compressor.

17. A method of controlling pressure of a tire comprising:
determining whether an available supply pressure of pressurized gas is less than a target tire pressure; and
executing a low supply pressure operating mode with an electronic control system when the available supply pressure is less than the target tire pressure, the low supply pressure operating mode including:
providing a pulse of pressurized gas from a pressurized gas source that provides a pressurized gas at an available supply pressure to a tire valve of the tire by opening an inlet valve and an outlet valve;
closing the inlet valve after a pressurized gas pulse duration time has elapsed;
waiting for a predetermined period of time to allow pressure to stabilize between the inlet valve and the tire;
determining an estimated tire pressure with a pressure sensor that is disposed between the inlet valve and the outlet valve based on the pulse of pressurized gas; and
inflating the tire with pressurized gas provided at the available supply pressure that is less than the target tire pressure when the estimated tire pressure is not within a threshold amount of the available supply pressure, wherein the available supply pressure is determined before determining whether the estimated tire pressure is less than the target tire pressure and a default operating mode is executed when the available supply pressure is greater than or equal to the target tire pressure.

18. The method of claim 17 wherein the tire is inflated to a pressure that is less than the target tire pressure.

19. The method of claim 18 wherein the tire is inflated to the available supply pressure.

20. The method of claim 17 wherein the pulse of pressurized gas is provided at the available supply pressure.

* * * * *